J. C. BARRETT.
WEIGHING SCALE.
APPLICATION FILED FEB. 9, 1916.
1,352,935.
Patented Sept. 14, 1920.
3 SHEETS—SHEET 1.
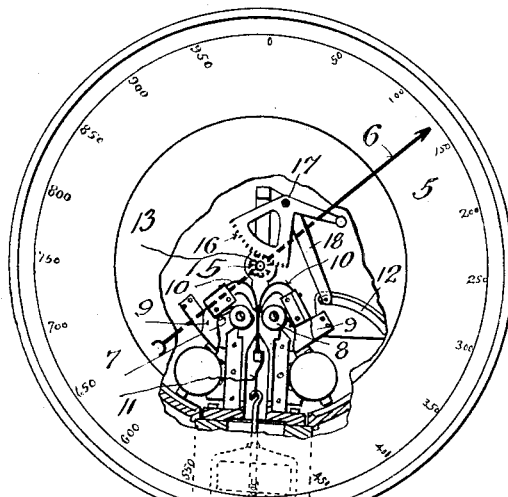
Inventor
Joseph C. Barrett
By his Attorney
T. F. Bourne

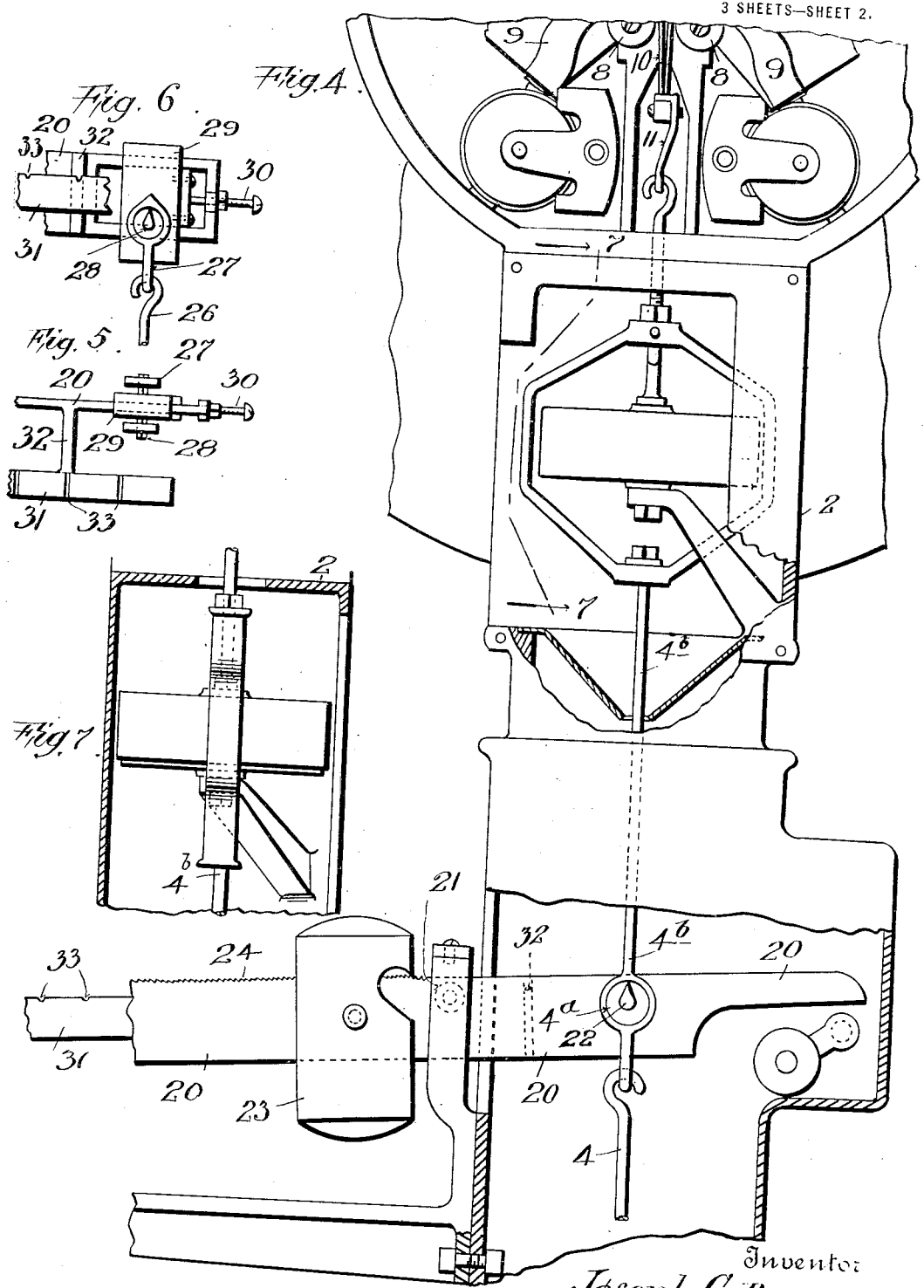

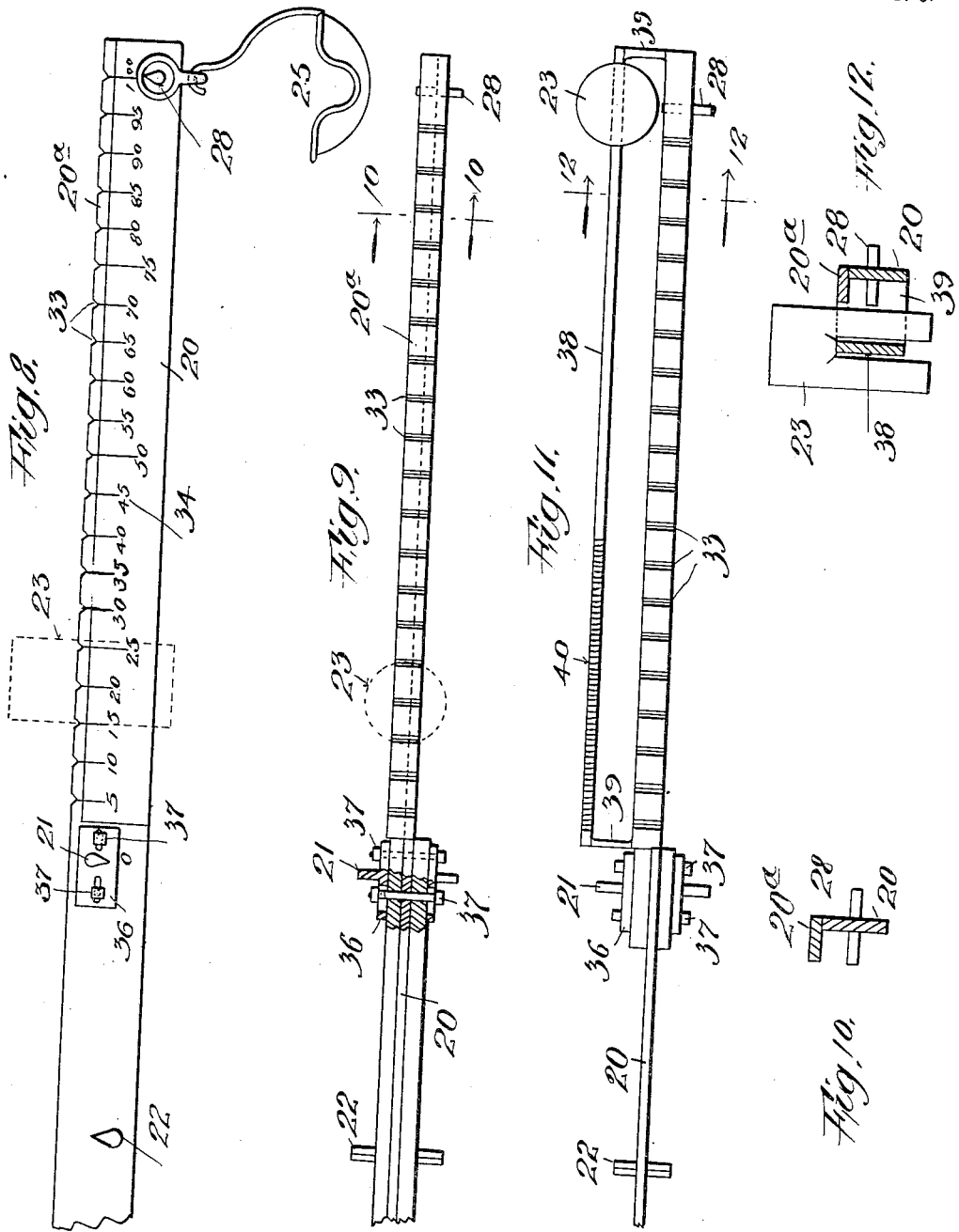

UNITED STATES PATENT OFFICE.

JOSEPH C. BARRETT, OF BROOKLYN, NEW YORK, ASSIGNOR TO AMERICAN KRON SCALE COMPANY, OF NEW YORK, N. Y., A CORPORATION OF NEW YORK.

WEIGHING-SCALE.

1,352,935. Specification of Letters Patent. Patented Sept. 14, 1920.

Application filed February 9, 1916. Serial No. 77,161.

*To all whom it may concern:*

Be it known that I, JOSEPH C. BARRETT, a citizen of the United States, and resident of New York city, borough of Brooklyn, in the county of Kings and State of New York, have invented certain new and useful Improvements in Weighing-Scales, of which the following is a specification.

Some weighing scales are provided with means whereby the number of articles placed upon the platform or in the weighing pan may be calculated or counted in addition to indicating the weight of such articles. My invention relates to improvements in such class of scales, and has for a particular object to provide simple and efficient means whereby one or several articles the same as those being weighed may be supported upon a beam or arm, (that is connected with the scale indicating mechanism), as the unit of calculation to determine directly therefrom the number of articles being weighed.

A further object of my invention is to provide means in connection with a scale mechanism having a dial and indicator, for causing such indicator, if the latter moves with the weight, (or the dial, if the latter moves with the weight), to return to, or approximately to, the zero indication when the proper number of articles are supported in required position upon the beam or arm, whereby, by multiplying the number of such articles by the established unit of calculation, the number of articles being weighed may be determined.

A further object of my invention is to provide a beam suitably supported and connected with the scale mechanism adapted to support articles to be utilized for counting, said beam also being adapted to support at least one of such articles at varying positions along the beam, graduations being provided along the beam to indicate sub-divisions of the unit of calculation established for the beam. As, for instance, if the beam be installed in connection with the scale mechanism as a unit for 100 articles being weighed for each such article supported upon the beam, then said graduations may be divided into hundreds, or other suitable divisions thereof, to indicate fractions or sub-divisions of such one-hundred unit in accordance with the position along the beam in which one of such articles being weighted or counted is placed.

My invention comprises novel details of improvement and combinations of parts that will be more fully hereinafter set forth and then pointed out in the claims.

Reference is to be had to the accompanying drawings forming part hereof, wherein, Figure 1 is a partly broken front view of a scale mechanism embodying my invention; Fig. 2 is a partly sectional plan view substantially on the line 2, 2, in Fig. 1; Fig. 3 is a partly sectional side elevation substantially on the line 3, 3, in Fig. 1; Fig. 4 is an enlarged partly broken detail view of part of Fig. 1, looking from the rear thereof; Fig. 5 is a detail plan view of the outer portion of the beam and arm; Fig. 6 is a partly broken side view of Fig. 5; Fig. 7 is a sectional detail on the line 7, 7, in Fig. 4; Fig. 8 is a detail side view of a structural modification; Fig. 9 is a partly sectional plan view thereof; Fig. 10 is a section on the line 10, 10, in Fig. 9; Fig. 11 is a plan view of another modification, and Fig. 12 is a section on the line 12, 12, in Fig. 11.

Similar numerals of reference indicate corresponding parts in the several views.

The scale illustrated in the accompanying drawings is of the platform variety wherein the numeral 1 indicates a suitable base, 2 a standard or upright thereon, 3 a lever, and $3^a$ a portion of a platform to coact with lever 3, all of which may be of any well known construction. The draft rod 4 is shown connected with lever 3 and passing upwardly through the standard whereby a weight upon the platform will cause a downward pull upon the draft rod for operating the weighing and scale indicating mechanism. At 5 is indicated a dial supported by standard 2, and at 6 is indicated a pointer or indicator adapted to sweep over the dial in an ordinary manner, although the dial may be caused to rotate instead of the pointer in any well known manner. The devices for weighing and for operating the indicator or pointer 6, or the dial, by a pull upon the draft rod, may be of any suitable or usual construction. In the example illustrated I have indicated devices having counter-weights operated by the draft rod for operating the pointer 6. The devices I have shown for such purpose are well known in the art, and in the example illustrated comprise flexible strips 7 hung from or supported by fulcrum blocks 8 and in turn supporting weighted arms 9. The strips 7, one for each weighted arm, are shown secured at opposite ends respectively to the fulcrum blocks and to the weighted arms, whereby the latter are flexibly supported. The weighted arms 9 are shown connected by flexible strips 10 with the draft rod by means of a suitable pulling device 11. One of the arms 9 is shown provided with a pointer-actuator shown in the form of a cam 12. At 13 is a shaft suitably mounted upon standard 2, to which the pointer 6 is connected, and said shaft carries a pinion 15 to mesh with a rack 16 that is pivotally supported at 17. Said rack is shown provided with an arm 18 that is operatively connected with the actuator or cam 12 for operating the pointer as the weighted arms 9 are moved by a pull upon the draft rod to indicate the weight of articles being weighed, or moved by a reverse motion of the draft rod by articles applied thereto for use in counting the number of articles being weighed, as hereinafter explained.

At 20 is a beam shown pivotally supported upon standard 2 at 21, and operatively connected with the draft rod. I have shown said beam provided with knife edges at 22 entering eyes or loops 4ª of part 4ᵇ of the draft rod, said knife edges being turned upwardly into coaction with the upper portion 4ᵇ of the draft rod, whereby when the draft rod is pulled by a weight upon the platform the beam 20 will be moved from a normal balanced position. Beam 20 may be utilized as a tare beam, for which purpose said beam may be provided with a poise or counterweight 23 adapted to be slid along the beam with relation to desired graduations 24. The relation of the short arm of the beam, or such portion thereof between pivot 21 and knife edges 22 with respect to the longer or outer portion of said beam, in conjunction with the platform levers, may be such as to provide any desired ratio therebetween with respect to an article, utilized as a counter, supported upon or from the outer portion of the beam. For instance, the ratio may be 100 to 1, whereby when a number of articles are upon the scale platform and one of such articles is placed upon the small pan 25, hanging from the outer portion of beam 20, one of such articles in such pan will represent 100 such articles upon the platform. The small pan 25 may be supported from beam 20 in any suitable manner. I have shown said pan provided with a hook or eye 26 adapted to be hung from a loop or hook 27 that is shown hung from knife edges 28 carried by a block 29 guided to slide upon beam 2. Said block is shown adjustable on the beam by means of a screw 30, rotatively connected with said block and meshing in threads at the end of the beam for retaining said block in adjusted position on the beam. At 31 is an auxiliary arm or bar carried by beam 20 and extending parallel therewith, adapted to support articles at different positions along said arm. Said arm or bar 31 is shown spaced from beam 20 and connected therewith by braces 32, whereby articles may be conveniently supported upon said arm irrespective of beam 20, and whereby poise or counter-weight 23 may be adjusted along the beam without interfering with bar 31. Arm 31 is provided with graduations suitably spaced apart, indicated at 33, and with numerals or other indications shown at 34, such graduations and indications being organized as sub-divisions or fractions of the unit of calculation established for beam 20 with respect to articles to be counted. For instance, if such unit calculation of the beam is 100, the graduations of the arm may be with respect to fractions of such 100, such as 5, 10, 15, etc. Graduations 33 are preferably in the form of transverse notches located in the upper edge of arm 31 to serve as stops for articles placed thereon, as well as for indicating sub-divisions of the calculating unit of the beam.

If articles are to be weighed, or counted, or weighed and counted, without regard to tare, the poise or counterweight 23 will be placed at its zero position to cause the tare beam 20 to assume the normal position, and when the article or articles to be weighed are placed upon the platform the pointer will be operated to indicate upon the dial the weight on the platform in an ordinary manner. If the number of articles on the platform are to be counted a suitable number of such articles will be placed in the small pan 25, whereupon beam 20 will be unbalanced and will rock, and as its counterbalancing weight is thereby relieved from the draft rod, more or less, as the articles are placed upon the pan, the draft rod will rise and the weighted arms 9 will descend. The actuator 12 for the pointer thereupon causes the rack and gear to operate the pointer shaft to return the pointer toward zero. If the articles in the pan cause the pointer to rest at zero the number of such articles may be multiplied by the unit of calculation established for the beam and the result will be the number of articles on the platform. For instance, if five articles are placed in pan 25 and pointer 6 is thereby caused to return to zero it will be known (according to the example given) that 500 such articles are upon the platform. If, however, the pointer does not return exactly to zero, but nearly so, then one of such articles in addition to those in pan 25, will be placed upon arm 31 and adjusted along the latter to such a position that will cause pointer 6 to point to zero, and then the numeral (34) of the graduations over or adjacent to which such article on the arm is then located, will indicate the number of such articles in excess of those calculated by reason of the number of articles in pan 25, such number to be added to the product of the number of articles on the pan multiplied by the calculating unit 100. Thus, if the article upon arm 31 rests at the graduations 65 and there are 5 such articles in pan 25, it will be known that there are 565 articles being weighed. If, when a number of articles are placed in pan 25, the beam 20 should cause pointer 6 to pass behind zero, it will be known that there are too many articles in the pan, and one of such articles will be removed from the pan and such article (or a similar one) may be placed upon arm 31 and located along the arm in such position as to cause the pointer to stop at zero. Thereupon the calculation will be made, as before noted, in accordance with the number of articles in pan 25 and the position of the article on arm 31 with respect to the graduations thereof.

In case the articles be placed upon the platform in a container, the weight of which is known, then the poise or counterweight 23 will be adjusted along beam 20 to the required position to counter-balance for the tare, and the weighing and counting will be carried out with respect to the articles in the container as before explained.

Instead of providing an arm or bar 31 extending along the beam to support articles as counters, with relation to the beam, the beam itself may be provided with means to support articles therealong directly thereon, instead of at one side thereof, with respect to the pivot or fulcrum 21 thereof. Such a construction is shown in Figs. 8 to 12, wherein the upper portion of the beam 20 is provided with notches or recesses 33 spaced apart to support an article thereon. Graduations at 34 are also shown in Fig. 8 with respect to the article retaining notches 33 before described. As a convenient means of constructing the beam to support articles thereon, said beam may be sufficiently wide for the purpose, or may be relatively narrow and provided with a widened upper portion as indicated at 20$^a$, Figs. 10 and 12. Such widened portion 20$^a$ may be a bar or strip secured on the upper edge of the beam in any suitable manner. The beam 20 may be utilized without a counterpoise for tare, although with the construction shown in Figs. 8 and 9 a counterpoise 23 may be slidably fitted upon the beam as indicated in dotted lines in said figures. Instead of adjusting pan 25 along the beam, as before referred to, the pivot or knife edges 21 may be adjusted along the beam for the purpose of balancing the beam as desired with respect to the weighing mechanism. For such purpose the respective knife edges or the like 21 may be carried by slotted plates 36, the slots of said plates receiving bolts or screws 37 for securing the plates in adjusted positions along the beam.

Where the beam is arranged for directly supporting thereon the articles as counters, and where with such beam a counterpoise for tare is desired to be mounted separately from the beam, as at one side thereof, such beam may be provided with a suitable bar 38 extending along and spaced from the beam and adapted to slidably support the counterpoise 23, see Figs. 11 and 12. The counterpoise-bar 38 may be secured to the beam 20 by means of brackets 39 suitably secured to said parts. Bar 38 may be provided with notches or grooves indicated at 40 for the counterpoise, in an ordinary manner.

With the beams arranged as set forth with respect to Figs. 8 to 12, one or more article or articles may be placed in pan 25 and one of such articles as a counter may be placed upon and adjusted along the beam, whereby such articles may be used as counters for determining the number of articles placed upon the scale platform or in the scale pan, in the manner before described.

My improvements are simple in construction and in operation. It will be apparent that since the beam is provided with a set support or pan for articles to be used as counters, in conjunction with means to support one or more of such articles in adjusted position along the beam, the mere placing of such articles in such pan and at a required distance along such beam with respect to its pivot or fulcrum, enables the direct calculation of the number of articles on the platform or weighing pan according to the unit established for the beam, without requiring the provision of counterpoises or weights for adjustment along the beam for the purpose of counting articles to be weighed.

While I have set forth the mechanism for operating the indicator or dial as connected with a platform, it will be obvious that such mechanism may be connected with a weighing pan to receive articles to be weighed or counted.

Having now described my invention what I claim is:—

1. A scale comprising an indicator and dial, mechanism to operate one of the former with respect to the other, a draft rod connected with said mechanism, means connected with the draft rod to support articles to be weighed or counted, a pivoted beam operatively connected with said draft rod between said means and mechanism, means carried by said beam at a distance from its pivot to receive articles as counters, said beam having means between its pivot and said article-receiving means to support an article as a counter at different distances from such pivot.

2. A scale comprising an indicator and dial, mechanism to operate one of the former with respect to the other, a draft rod connected with said mechanism, means connected with the draft rod to support articles to be weighed or counted, a pivoted beam operatively connected with said draft rod between said means and mechanism, a pan carried by said beam at a distance from its pivot to receive articles as counters, said beam being also provided between its pivot and said pan with means to support an article as a counter at points between said pivot and pan.

3. A scale comprising an indicator and dial, mechanism to operate one of the former with respect to the other, a draft rod connected with said mechanism, means connected with the draft rod to support articles to be weighed or counted, a pivoted beam operatively connected with said draft rod between said means and mechanism, means carried by said beam at a distance from its pivot to receive articles as counters, said beam having means between its pivot and said article-receiving means to support an article as a counter at different distances from such pivot, and a counterpoise adjustable along said beam to serve for tare.

4. A scale comprising an indicator and dial, mechanism to operate one of the former with respect to the other, a draft rod connected with said mechanism, means connected with the draft rod to support articles to be weighed or counted, a pivoted beam operatively connected with said draft rod between said means and mechanism, means carried by said beam at a distance from its pivot to receive articles as counters, and an arm carried by and extending along said beam and provided with means to support articles as counters between said pivot and said article supporting means.

5. A scale comprising an indicator and dial, mechanism to operate one of the former with respect to the other, a draft rod connected with said mechanism, means connected with the draft rod to support articles to be weighed or counted, a pivoted beam operatively connected with said draft rod between said means and mechanism, means carried by said beam at a distance from its pivot to receive articles as counters, and an arm carried by and extending along said beam and provided with notches spaced apart to retain one of the articles as a counter on said arm.

Signed at New York city, in the county of New York and State of New York, this 8th day of February, A. D. 1916.

JOSEPH C. BARRETT.

Witnesses:
T. F. BOURNE,
MARIE F. WAINRIGHT.